United States Patent [19]

Tooley

[11] 4,033,379
[45] July 5, 1977

[54] PNEUMATIC VALVE INTERLOCK SYSTEM
[75] Inventor: Clyde E. Tooley, Vicksburg, Mich.
[73] Assignee: The Upjohn Company, Kalamazoo, Mich.
[22] Filed: Dec. 18, 1975
[21] Appl. No.: 642,074
[52] U.S. Cl. .................... 137/637.1; 74/483 R; 251/94
[51] Int. Cl.² .................................. F16K 35/14
[58] Field of Search ............... 137/637.1; 251/94; 74/483 R, 483 K

[56] References Cited
UNITED STATES PATENTS

| 2,457,610 | 12/1948 | Stevens | 137/637.1 X |
| 3,856,037 | 12/1974 | Garrett et al. | 137/637.1 X |

Primary Examiner—Martin P. Schwadron
Assistant Examiner—Richard Gerard
Attorney, Agent, or Firm—Blanchard, Flynn, Thiel, Boutell & Tanis

[57] ABSTRACT

A fluid-actuated interlock system for automatically controlling a plurality of remotely located valve assemblies. A fluid switch and a locking device are disposed for cooperation with each valve operator. The fluid switches are connected to a supply line for a pressure fluid, and the locking devices are connected to a manifold. Communication is permitted between the supply line and the manifold only when one of the fluid switches is moved into an open position. Each fluid switch is maintained in a closed position by its respective valve operator in a preselected position. When one valve operator is moved away from this preselected position, the associated fluid switch is opened whereby pressure fluid flows from the supply line into the manifold which in turn supplies pressure fluid to the locking devices associated with the remaining valve operators. The locking devices are thereby actuated whereby a locking member is moved into a position preventing movement of the valve operators away from said preselected positions.

11 Claims, 5 Drawing Figures

PNEUMATIC VALVE INTERLOCK SYSTEM

FIELD OF THE INVENTION

This invention relates to an improved fluid-actuated interlock system for automatically controlling the actuation of a plurality of remotely located valve assemblies.

BACKGROUND OF THE INVENTION

Valves have been conventionally provided with an interlock, normally manually actuated, for permitting the valve operator to be locked in either an open or closed position. However, in fluid systems incorporating a plurality of valves, the interlocks associated with the valves are normally independent of one another, and accordingly exert no control or regulation over the plurality of valves as associated with the complete system.

However, in some fluid systems, proper operation of the system occurs only when the opening and closing of the individual valves is controlled or regulated. For example, some systems will properly operate if only one of the valve assemblies associated with the system is in an open condition, since if several valve assemblies are simultaneously opened, the required fluid quantities and/or pressure will thus not be available within the system. To inusre proper operation in systems of this type, interlocks are known which mechanically interconnect the operators of a plurality of valve assemblies so that only one valve assembly can be operated at a time, with the remaining valve assemblies being mechanically locked in an inoperative condition. While such mechanical interlock systems do provide the necessary control over a plurality of valves, nevertheless these mechanical interlock systems normally require that the valves be grouped together or clustered at a common location in order to facilitate the mechanical interconnection of the interlocks associated with the individual valves. This necessity of having to cluster or group the valves is, however, completely unacceptable and often impossible in many types of fluid systems, particularly when the fluid system is being used to supply a pressure fluid to many remote locations.

While pneumatic interlock systems have also been devised for use in controlling the actuation of valves, nevertheless these known systems have not possessed the simplicity and reliability necessary to provide for precise and dependable control over a plurality of valve assemblies, particularly when said valve assemblies are remotely located with respect to one another.

Accordingly, it is an object of the present invention to provide an improved fluid-actuated interlock system for controlling a plurality of valve assemblies, which interlock system overcomes the above-mentioned disadvantages. More specifically, it is an object of this invention to provide:

1. An interlock system, as aforesaid, which can safely and reliably control the actuation of a plurality of remotely located valve assemblies, which interlock system can regulate the valve assemblies so that only a single valve assembly can be operated at any one time, with the remaining valve assemblies being lockingly held in their inactive positions.
2. An interlock system, as aforesaid, which precisely and reliably regulates the opening and closing of the valve assemblies to thereby provide the system with optimum safety and/or product control.
3. An interlock system, as aforesaid, which is preferably pneumatically actuated whereby individual interlocks can be directly associated with a plurality of remotely located valve assemblies while interconnected in a simple and efficient manner by means of conventional fluid conduits.
4. An interlock system, as aforesaid, which utilizes a simple and reliable fluid switching device and fluid locking device associated with each valve assembly, with the switching and locking devices of the plural valve assemblies being interconnected to a main pressure fluid line and a main manifold, respectively, to thereby simplify the interconnection and operation of the system.
5. An interlock system, as aforesaid, which is of a simple and durable structure, which is economical to manufacture and simple to install, which operates simply and successfully when the valves are remotely located relative to one another, and wherein insures that only the selected valve assembly will be operated while simultaneously preventing the operation of the remaining valve assemblies.

Other objects and purposes of this invention will be apparent to persons acquainted with systems of this type upon reading the following specification and inspecting the accompanying drawings.

Figure 1:
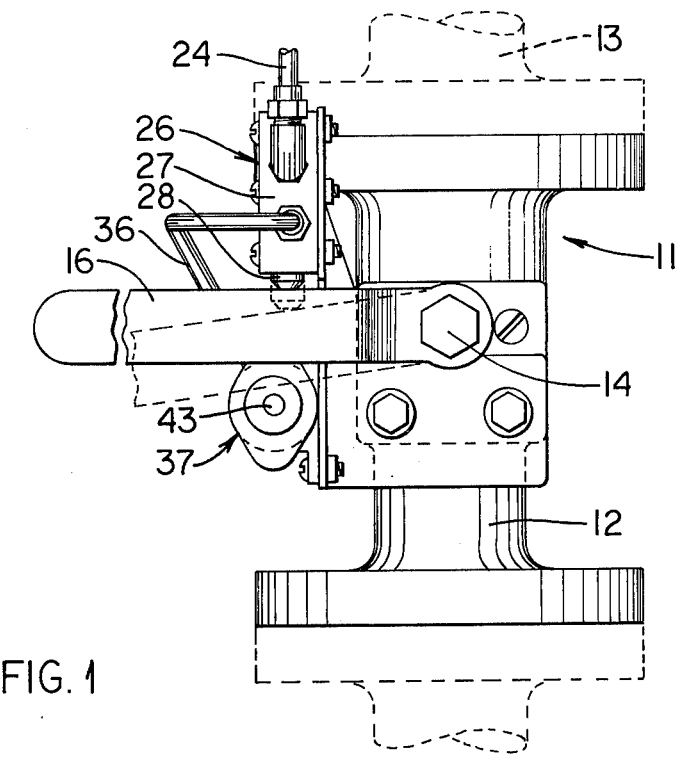
FIG. 1 is a top view of a valve assembly having fluid switching and locking devices associated therewith.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and associated parts thereof. Said terminology will include the words specifically mentioned, derivatives thereof and words of similar import.

SUMMARY OF THE INVENTION

This invention provides a fluid-actuated interlock system for controlling the actuation of a plurality of valve assemblies, which valve assemblies may be remotely located. A fluid switching device, as associated with the operator of each valve assembly, is connected to a pressure source through a main supply line. Each fluid switching device has a control element which engages a valve operator when same is in a preselected position, whereby the switching device is maintained closed. Each fluid switching device is also connected to a main manifold which is isolated from the supply line when all of the switching devices are closed. When one of the operators is moved away from its preselected position, the respective switching device is opened whereby the main supply line and main manifold communicate with one another. The manifold is also in fluid communication with a plurality of fluid locking devices, one of which is associated with the operator of each valve assembly. The locking devices are normally maintained in a released position. However, when pressure fluid is supplied to the manifold, then the locking devices associated with the remaining valve assemblies are energized so that the valve operators are lockingly held in their preselected positions.

DETAILED DESCRIPTION

Figure 2:
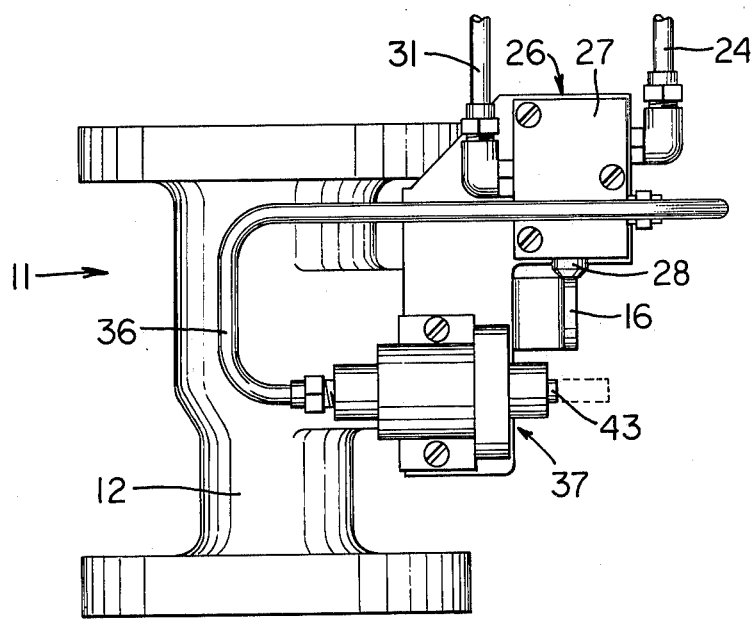
FIG. 2 is a side view of the valve assembly as appearing from the left side of FIG. 1.

FIGS. 1 and 2 illustrate therein a conventional valve assembly 11 having a tubular valve housing 12 adapted to be disposed within a pipeline 13 for controlling the flow of a fluid or fluent material therethrough. The valve assembly 11 may be of any conventional configuration, and in the illustrated embodiment comprises a conventional gate valve assembly having a valve member swingably positioned within the tubular valve housing 12 for selectively opening and closing the passageway therethrough. The valve member has a valve stem 14 having projects outwardly through the valve housing and is provided with a valve actuator or operator 16 for controlling the opening and closing of the valve member. The operator 16, in the illustrated embodiment, comprises a leverlike arm which has one end thereof secured to the valve stem, whereby when the arm projects outwardly as illustrated in FIG. 1, the gate valve is closed. By swinging the arm 16 downwardly into alignment with the valve housing, the valve member is swingably moved into a fully open position. The structure and operation of the valve assembly 11 is conventional, and such valve assemblies are commercially available in many different forms and variations.

Figure 3:
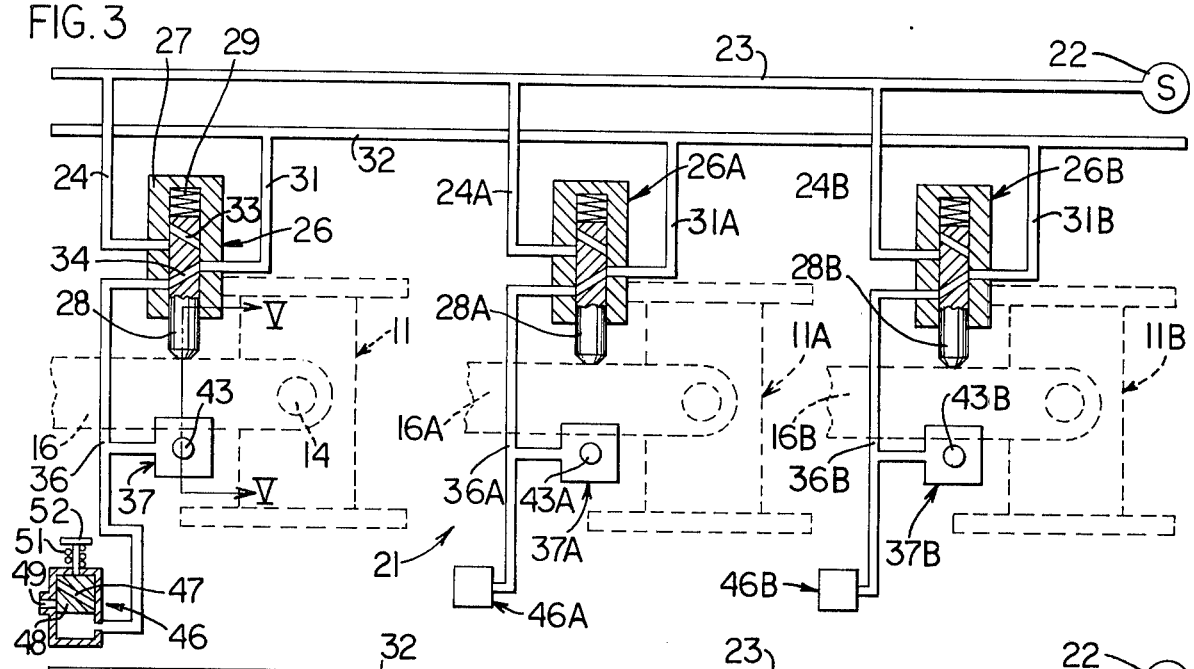
FIGS. 3 and 4 diagrammatically illustrate a fluid-actuated interlock system as associated with a plurality of valve assemblies.
Figure 4:
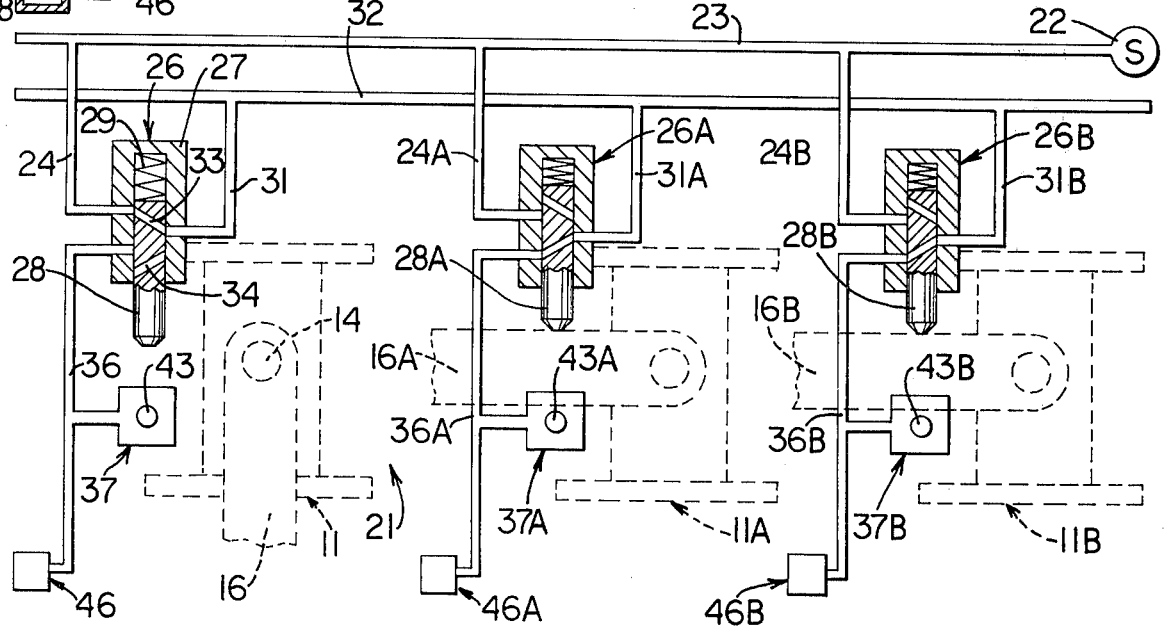

Referring now to FIGS. 3 and 4, the present inventon relates to a valve interlock system 21 which is fluid actuated, preferably pneumatically actuated, for controlling the actuation of a plurality of valve assemblies. For purpose of illustration, the system 21 is illustrated as being associated with three substantially identical valve assemblies 11, 11A and 11B, which valve assemblies may be remotely located relative to one another. The valve assemblies 11, 11A and 11B respectively have swingable operators or arms 16, 16A and 16B associated therewith for permitting the individual valve assemblies to be selectively opened and closed, such as by manual actuation of the respective operators.

The interlock system 21 includes a main supply line 23 connected to a source 22 of pressure fluid, such as air. The main supply line is connected through a supply conduit 24 to a fluid switching device 26 which is associated with the operator 16. Further, parallel supply conducts 24A and 24B are respectively connected to fluid switching devices 26A and 26B, which switching devices in turn are respectively associated with the operators 16A and 16B. The fluid switching devices 26A and 26B are identical to the device 26, as described below.

The fluid switching device 26 comprises a three-way spool valve, and includes a housing 27 having a valve spool 28 slidably supported thereon. Valve spool 28 is acted on by spring 29 and is urged outwardly into engagement with the operator 16 when same is in a preselected position as shown in FIG. 3, which preselected position corresponds to the "closed" position of the valve assembly 11. Valve spool 28 thus acts as a sensor so as to physically detect the presence of the operator 16 when in said preselected position.

The switching device 26 is also connected to an intermediate conduit 31 which in turn connects to a main control line or manifold 32. The valve spool 28 has a first port 33 formed therein which is closed when the valve spool is maintained in the position illustrated in FIG. 3, whereby the lines 23 and 32 are isolated from one another.

A further port 34 is formed in the spool 28 thereof, which port provides communication between the intermediate conduit 31 and a further conduit 36 when the switching device is in its closed position as illustrated in FIG. 3. The further conduit 26 in turn is connected to a fluid locking device 37 associated with the valve assembly 11, which device 37 is normally maintained in a deenergized or a "release" position.

The remaining switching devices 26A and 26B are similarly connected to the main control line 32 by means of intermediate conduits 31A and 31B, respectively, which conduits are connected in parallel with the conduit 31 and are isolated from the main supply line 23 when the switching devices 26A and 26B are closed.

Figure 5:
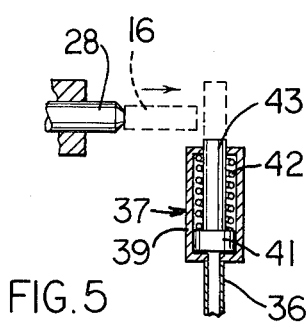
FIG. 5 is a fragmentary sectional view taken substantially along the line V—V of FIG. 3, as rotated 90°.

The locking device 37, as illustrated in FIG. 5, comprises a housing 39 having a chamber therein in which is slidably accommodated a piston 41. The piston 41 is normally urged by spring 42 into the position illustrated in FIG. 5, in which position the locking pin 43 as fixedly associated with the piston is maintained in a retracted position whereby same does not interfere with the movement of the operator 16 away from its preselected position, which movement occurs in the direction of the arrow as appearing in FIG. 5. However, when pressure fluid is supplied through conduit 36 to the locking device 37, the piston 41 is moved upwardly so that locking pin 43 assumes a position substantially as illustrated by dotted lines in FIG. 5, in which position the locking pin is disposed within the path of movement of the operator 16 and hence prevents any substantial movement of the operator 16 away from its preselected position.

The remaining valve assemblies 11A and 11B also have fluid locking devices 37A and 37B, respectively, associated therewith, which locking devices are identical to the device 37 and are interconnected to the respective switching devices 26A and 26B by means of further conduits 36A and 36B, respectively.

The valve assembly 11 also has a normally closed vent device 46 associated with the conduit 36, and identical vent devices 46A and 46B are associated with the valve assemblies 11A and 11B respectively.

OPERATION

Although the operation of the present invention is believed apparent from the description set forth above, nevertheless same will be briefly described to insure a complete understanding thereof.

When all of the valve assemblies are closed, whereupon the operators 16, 16A and 16B are in their respective preselected positions as illustrated by dotted lines in FIG. 3, the valve spool 28, 28A and 28B associated with each fluid switching device will accordingly bear against the respective operator and the fluid switching devices 26, 26A and 26B will all be maintained in a closed position. In this closed position, the control manifold 32 is effectively isolated from the main supply line 23. However, the control manifold 32 is in communication with each of the locking devices 37, 37A and 37B as shown in FIG. 3.

When one of the operators, such as the operator 16, is moved away from its preselected position so as to cause opening of the valve assembly 11, which movement of the operator causes it to assume the position illustrated by dotted lines in FIG. 4, the spring 29 urges the valve spool 28 outwardly into an open position, in which position the intermediate conduit 24 communicates through the port 33 with the intermediate conduit 31. Pressure fluid, such as pressurized air, thus flows from main supply line 23 into the manifold 32, thence through the conduits 31A and 31B and the associated conduits 36A and 36B into the fluid locking devices 37A and 37B. The pistons associated with these locking devices are accordingly displaced in opposition to the urging of the springs (such as springs 42) so that the locking pins 43A and 43B are extended into a position wherein they are disposed directly adjacent the operators 16A and 16B. This position of the locking pins 43A and 43B prevents the operators 16A and 16B from being swingably moved away from the preselected position (that is, the closed position) of the valve. The valve assemblies 11A and 11B accordingly cannot be opened so long as the valve assembly 11 is open.

During the opening of the valve assembly 11, which permits an extension of the valve spool 28 into the position illustrated in FIG. 4, the conduit 36 is isolated from the conduit 31 so that the fluid locking device 37 is accordingly not energized.

Thus, so long as the valve assembly 11 is maintained in an open position, no other valve assembly can be opened. However, when operator 16 is swingably returned to its preselected position (as shown in FIG. 3) so as to close the valve assembly 11, then the operator 16 will again engage the valve spool 28 and push same into the housing 27. This causes the pressure conduit 24 to again be isolated from the conduit 31, and hence the connection between the conduits 31 and 36 is restored when the valve operator 16 reaches its preselected position as shown in FIG. 3. The vent device 36, which is located at any convenient position, such as adjacent the respective valve assembly, is then momentarily manually depressed so that the passage 47 in valve 48 connects the conduit 36 to the vent port 49. This vents the pressurized air into the atmosphere and accordingly permits depressurization of the manifold 32 and of the locking devices 37A and 37B. The locking pins associated with the locking devices 37A and 37B are accordingly retracted due to the urging of the internal springs associated with the locking devices. The valve plunger 52 is then released, whereupon spring 51 returns the valve 48 to its closed position. After the locking devices are released, any one of the operators 16, 16A or 16B can accordingly be swingably moved so as to open the respective valve assembly.

While the illustrated embodiment discloses the interlock system 21 as being associated with three different valve assemblies, it will be apparent that any desired number of valve assemblies can be incorporated into the system by connecting the plurality of switching and locking devices in parallel between the lines 23 and 32, as illustrated in FIGS. 3 and 4.

The interlock system as illustrated and described controls the opening of the valve assemblies, as by sensing a preselected position of each individual valve operator when the respective valve assembly is closed. Nevertheless, this could be reversed so as to control the closing of the valve assemblies merely by sensing the open position of the valve operator. With such a system, no more than one valve assembly could then be closed at any one time. This mode of operation would be particularly desirable in systems utilizing a high pressure fluid so as to prevent the accidental closure of several valves at one time, which condition might cause an undesirable pressure buildup within the system.

While the interlock system has been disclosed in combination with a valve operator which is swingably or rotatably moved through an angle of approximately 90° when moving between opened and closed positions, it will be appreciated that the interlock system of the present invention is also equally applicable to valve operation which are rotatably moved through angles which are either smaller or larger than 90°. For example, the operator could be applied to an operator which is movable through substantially a complete revolution. Also, instead of utilizing a leverlike handle, the operator may comprise a hand wheel having portions thereon adapted for coaction with the switching and locking devices in a manner substantially similar to the described embodiment.

The system of the present invention is also applicable to other types of valves, such as a globe valve, wherein the operator comprises a rotatable handwheel threadably connected to a valve shaft which is appropriately moved into or out of a housing so as to close or open a valve when the handwheel is rotated. With this type of structure, the handwheel could be provided with a hub thereon disposed for contact with the switching device, which switching device could be mounted on a separate member fixed to the threaded shaft so that the switching device would accordingly move with the shaft and thus be displaced toward or away from the hub in response to rotation of the handwheel. In this variation, the locking device could be positioned so that the locking pin would coact with a part of the locking wheel to prevent rotation of same.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with a plurality of valve assemblies each having an external valve operator movable between first and second positions for controlling the opening and closing of the valve assembly, the valve operator of each valve assembly being normally maintained in said first position, and a fluid-actuated interlock system cooperating with the operators of said plurality of valve assemblies for permitting only one of said operators to be moved away from said first position at any one time, said interlock system comprising:

a pressure fluid supply line, and means connected to said supply line for supplying pressure fluid thereto;

a control manifold adapted to have pressure fluid supplied a plurality of conduit means disposed substantially in parallel and connected between said supply line and said control manifold, one of said conduit means being associated with each of said valve assemblies;

fluid switching means associated with each of said conduit means for normally preventing the flow of pressure fluid from said supply line to said control manifold, said fluid switching means being mounted adjacent the respective valve assembly and having a switching member movable between first and second positions, said fluid switching means having means associated therewith for normally maintaining said switching member in said first position wherein said conduit means is open and permits the flow of pressure fluid from said supply line to said control manifold, said switching member being engaged with the valve operator of the respective valve assembly when said valve operator is in said first position so that said switching member is maintained in said second position wherein said conduit means is closed to thereby prevent the flow of pressure fluid from said supply line to said control manifold;

a fluid-actuated locking device disposed adjacent each said valve assembly for preventing movement of the respective valve operator away from said first position when the respective locking device is energized, said locking device includng a locking member movable between a deenergized position wherein said locking member is disengaged from the respective valve operator and is spaced from the path of movement thereof, and an energized position wherein the locking member is positioned in the path of movement said valve operator to prevent any significant movement of said valve operator away from said first position; and passage means associated with each said locking device for interconnecting said locking device to said control manifold to permit energization of said locking device when pressure fluid is supplied to said control manifold;

whereby movement of one valve operator away from said first position causes the associated switching means to be opened to thereby supply pressure fluid to the control manifold, which in turn supplies pressure fluid to the locking devices associated with the remaining valve assemblies to thereby energize said locking devices and hold the valve operators associated with the remaining valve assemblies in said first position.

2. A combination according to claim 1, wherein said fluid switching means as associated with each valve assembly is also connected with the respective passage means for controlling the flow of pressure fluid therethrough, said passage means communicating with said control manifold when the respective switching means is in said second position, said switching means closing said passage means when the switching member is in said first position, whereby the fluid locking device as associated with the valve assembly which is actuated is isolated from the control manifold and is not energized.

3. A combination according to claim 2, wherein said fluid switching means comprises a three-way valve means, and wherein said switching member comprises a slidable valve spool associated with said three-way valve means.

4. A combination according to claim 1, wherein said conduit means includes a first conduit connected between said supply line and the respective fluid switching means, and a second conduit connected between the respective switching means and the control manifold; and said switching member when in said first position permitting communication between said first and second conduits, said switching member when in said second position preventing communication between said first and second conduits.

5. A combination according to claim 4, wherein said passage means as associated with each said locking device comprises a third conduit connected between said locking device and the respective fluid switching means, and said switching member when in said second position providing communication between said second and third conduits, said switching member when in said first position preventing communication between said second and third conduits.

6. A combination according to claim 5, wherein said switching member comprises a slidable valve spool having first and second flow passages associated therewith, said first flow passage providing communication between said first and second conduits when said spool is in said first position, and said second flow passage providing communication between said second and third conduits when said spool is in said second position.

7. A combination according to claim 6, wherein said fluid-actuated locking device comprises a fluid pressure cylinder having a movable piston which is moved from said deenergized position to said energized position in response to the supply of pressure fluid thereto said fluid pressure cylinder having spring means associated therewith for normally maintaining said piston in said deenergized position, and said locking member comprising a pinlike element fixed to said piston and projecting axially of said fluid pressure cylinder.

8. A combination according to claim 5, including normally closed vent means associated with said third conduit.

9. A combination according to claim 1, wherein said valve operator is mounted for rotational movement within a plane, wherein said locking member is linearly movable in a direction substantially perpendicular to said plane, and wherein said switching member is linearly movable in a direction substantially parallel to said plane.

10. In combination with a plurality of remotely located valve assemblies each having a movable external valve operator which is normally maintained in a preselected position, and a fluid-actuated interlock system cooperating with said operators for permitting only a single valve operator to be moved away from its preselected position at any one time, said interlock system being operated solely in response to movement of said operators and independently of flow through said valve assemblies, said interlock system comprising:

a fluid-actuated locking device disposed adjacent and associated with each valve operator to prevent movement of the respective valve operator away from its preselected position when said locking device is actuated, said locking device including a locking member movable between a released and an actuated position, said locking member when in said actuated position preventing any significant movement of said valve operator away from said preselected position;

means associated with each said locking device for normally maintaining the respective locking member in said released position;

conduit means connected to the locking devices for supplying pressure fluid thereto to permit energization thereof;

flow control valve means associated with said conduit means for controlling the flow of pressure fluid to said locking devices, said flow control valve means normally preventing pressure fluid from being supplied to said locking devices; and sensing means associated with each said valve operator and interconnected to said flow control valve means for causing opening of said valve means when said sensing means senses the movement of one of said valve operators away from its preselected position, the opening of said flow control valve means by said sensing means causing pressure fluid to be supplied to said locking devices as associated with at least the remaining valve operators to lock same in same preselected positions.

11. A system according to claim 10, wherein said flow control valve means includes a separate valve device associated with each valve operator, and wherein said sensing means includes a separate sensor disposed adjacent and associated with each valve operator for sensing movement thereof away from said preselected position.

* * * * *

UNITED STATES PATENT AND TRADEMARK OFFICE
CERTIFICATE OF CORRECTION

PATENT NO. : 4 033 379
DATED : July 5, 1977
INVENTOR(S) : Clyde E. Tooley

It is certified that error appears in the above-identified patent and that said Letters Patent are hereby corrected as shown below:

| | |
|---|---|
| Column 2, line 19; | change "wherein" to ---which---. |
| Column 3, line 19; | change "having" to ---which---. |
| Column 3, line 36; | change "purpose" to ---purposes---. |
| Column 5, line 36; | change "device 36" to ---device 46---. |
| Column 6, line 10; | change "operation" to ---operators---. |
| Column 6, line 58; | after "supplied" insert ---thereto;---. |

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*